US012636834B2

(12) United States Patent
Tsai et al.

(10) Patent No.: US 12,636,834 B2
(45) Date of Patent: May 26, 2026

(54) RANDOM DECORATIVE PATTERNS FOR USE IN MANUFACTURING PARTS

(71) Applicant: ASSA ABLOY Residential Group, Inc., New Haven, CT (US)

(72) Inventors: Ping Hsien Tsai, Walnut, CA (US); William Carl Zhang, Los Angeles, CA (US)

(73) Assignee: ASSA ABLOY Residential Group, Inc., New Haven, CT (US)

( * ) Notice: Subject to any disclaimer, the term of this patent is extended or adjusted under 35 U.S.C. 154(b) by 315 days.

(21) Appl. No.: 18/196,808

(22) Filed: May 12, 2023

(65) Prior Publication Data

US 2024/0286357 A1     Aug. 29, 2024

Related U.S. Application Data

(60) Provisional application No. 63/448,245, filed on Feb. 24, 2023.

(51) Int. Cl.
*B29C 64/386*          (2017.01)
*B33Y 50/00*           (2015.01)

(52) U.S. Cl.
CPC ............. *B29C 64/386* (2017.08); *B33Y 50/00* (2014.12)

(58) Field of Classification Search
CPC ........ B29C 64/386; B33Y 50/00; B33Y 10/00
See application file for complete search history.

(56) References Cited

U.S. PATENT DOCUMENTS

| | | | | |
|---|---|---|---|---|
| 11,652,281 | B1 * | 5/2023 | Birnbach | H01Q 1/36 |
| | | | | 102/206 |
| 2010/0251455 | A1 * | 10/2010 | Lampe | A41D 1/06 |
| | | | | 2/159 |
| 2015/0278487 | A1 * | 10/2015 | Scott | H04L 9/3239 |
| | | | | 726/28 |
| 2017/0309208 | A1 * | 10/2017 | Yin | G09F 19/14 |
| 2018/0042718 | A1 * | 2/2018 | Remenschneider | |
| | | | | A61L 27/3839 |
| 2019/0255878 | A1 * | 8/2019 | Devoret | E04F 21/04 |
| 2020/0339925 | A1 * | 10/2020 | Miller | C12M 25/14 |
| 2022/0126074 | A1 * | 4/2022 | Roseberry | A61M 31/00 |

OTHER PUBLICATIONS

Webpages, Emtek's Galapagos project, dated Mar. 4, 2022, https://excelmkting.com/emteks-galapagos-project/, 6 pgs.
Webpages, Luxe Interiors and Design, dated Mar. 17, 2022, https://luxesource.com/article/product-showcase-emtek, 3 pgs.
Webpages, The Chicago Anthenaeum Museum of Architecture and Design, dated Dec. 13, 2022, https://www.chi-athenaeum.org/good-design-awards-hardware-2022/2022/12/13/the-galapagos-project-2021-2022/, 1 pg.

* cited by examiner

*Primary Examiner* — Chad G Erdman
(74) *Attorney, Agent, or Firm* — Calfee, Halter & Griswold LLP

(57)          ABSTRACT
Methods and systems for manufacturing a part with a random decorative pattern are described. In some embodiments, a part may be manufactured by obtaining a three-dimensional model of the part, generating a random decorative patter using a random pattern generator, and then modifying the three-dimensional model based on the random decorative pattern. A build plan may be then generated for use by a manufacturing system to manufacturing the part using any appropriate type of manufacturing process.

20 Claims, 7 Drawing Sheets

Obtain a three-dimensional model of a part ~10

Generate a random pattern ~11

Modify the 3D model based on the generated random pattern ~12

Generate a build plan of the modified three-dimensional model ~13

Store the build plan (optional) ~14

Operate an additive manufacturing system using the build plan to build one or more parts based on the modified three-dimensional model (optional) ~15

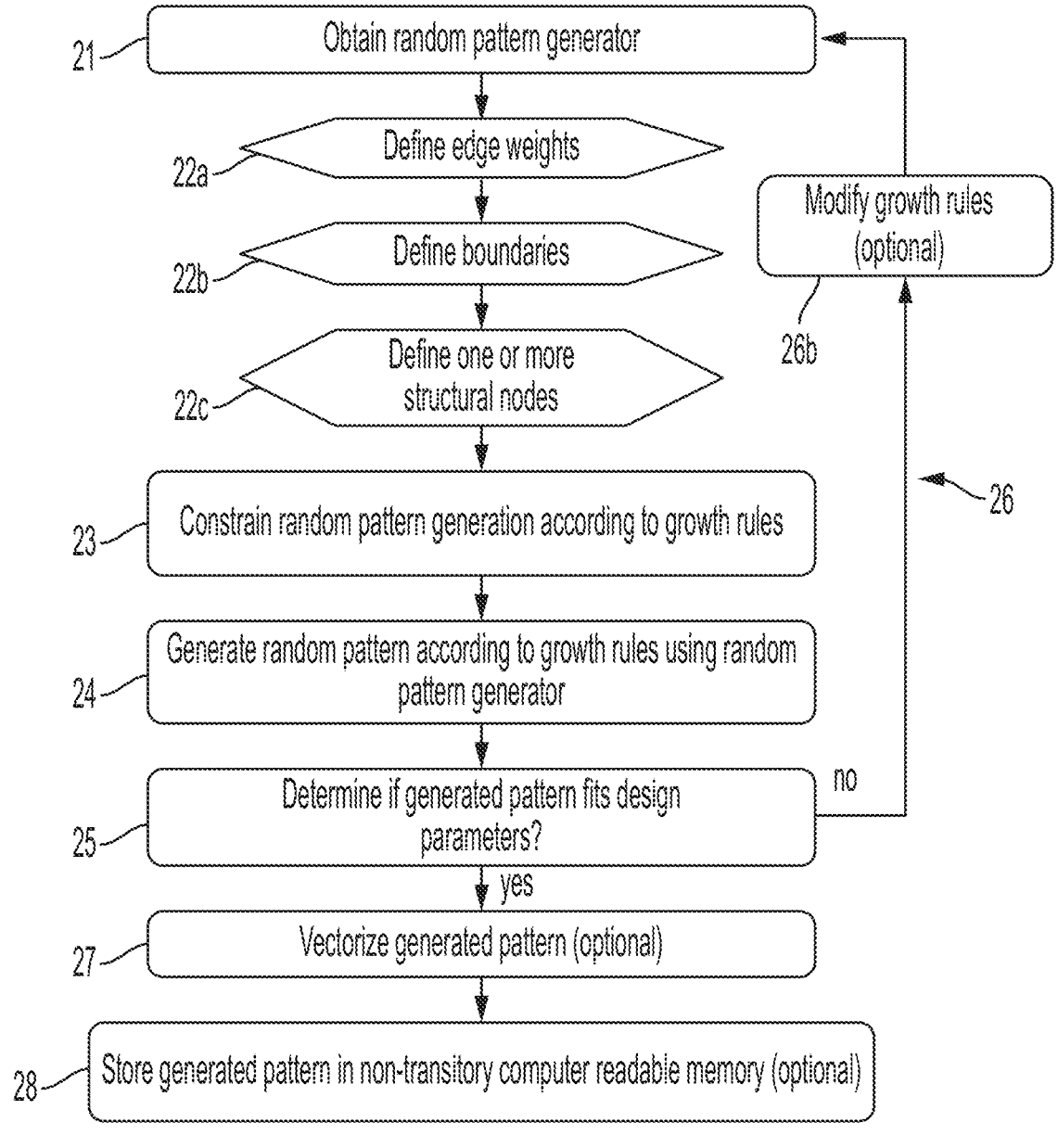

21 — Obtain random pattern generator

22a — Define edge weights

22b — Define boundaries

22c — Define one or more structural nodes

23 — Constrain random pattern generation according to growth rules

24 — Generate random pattern according to growth rules using random pattern generator 25 — Determine if generated pattern fits design parameters?

26b — Modify growth rules (optional)

26 no yes

27 — Vectorize generated pattern (optional)

28 — Store generated pattern in non-transitory computer readable memory (optional)

FIG. 2

RANDOM DECORATIVE PATTERNS FOR USE IN MANUFACTURING PARTS

RELATED APPLICATIONS

This application claims the benefit under 35 U.S.C. § 119(e) to U.S. Provisional Application Ser. No. 63/448,245, filed on Feb. 24, 2023, which is herein incorporated by reference in its entirety.

FIELD

Disclosed embodiments are related to systems and methods for generating random decorative patterns for use in manufacturing parts.

BACKGROUND

Typical manufacturing of fixtures and other parts may include the use of preset molds, machining procedures, and/or other manufacturing processes to provide parts with a uniform replicated design that may be reproduced thousands to millions of times depending on the part being manufactured. These unchanging and repeated production methods and systems permit the mass production of large quantities of uniform parts.

SUMMARY

In one embodiment, a method of manufacturing a part includes: obtaining a three-dimensional model of at least a portion of the part; generating a random decorative pattern using a random pattern generator; and modifying the three-dimensional model based at least in part on the random decorative pattern.

In some embodiments, a non-transitory computer readable memory may include processor executable instructions that when executed perform the above method.

In some embodiments, a system for manufacturing a part with a decorative pattern includes: one or more processors configured to: obtain a three-dimensional model of at least a portion of the part; generate a random decorative pattern using a random pattern generator; and modify the three-dimensional model based at least in part on the random decorative pattern.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 2 is a flowchart detailing one embodiment of a process for generating a random decorative pattern;

DETAILED DESCRIPTION

Figure 1:
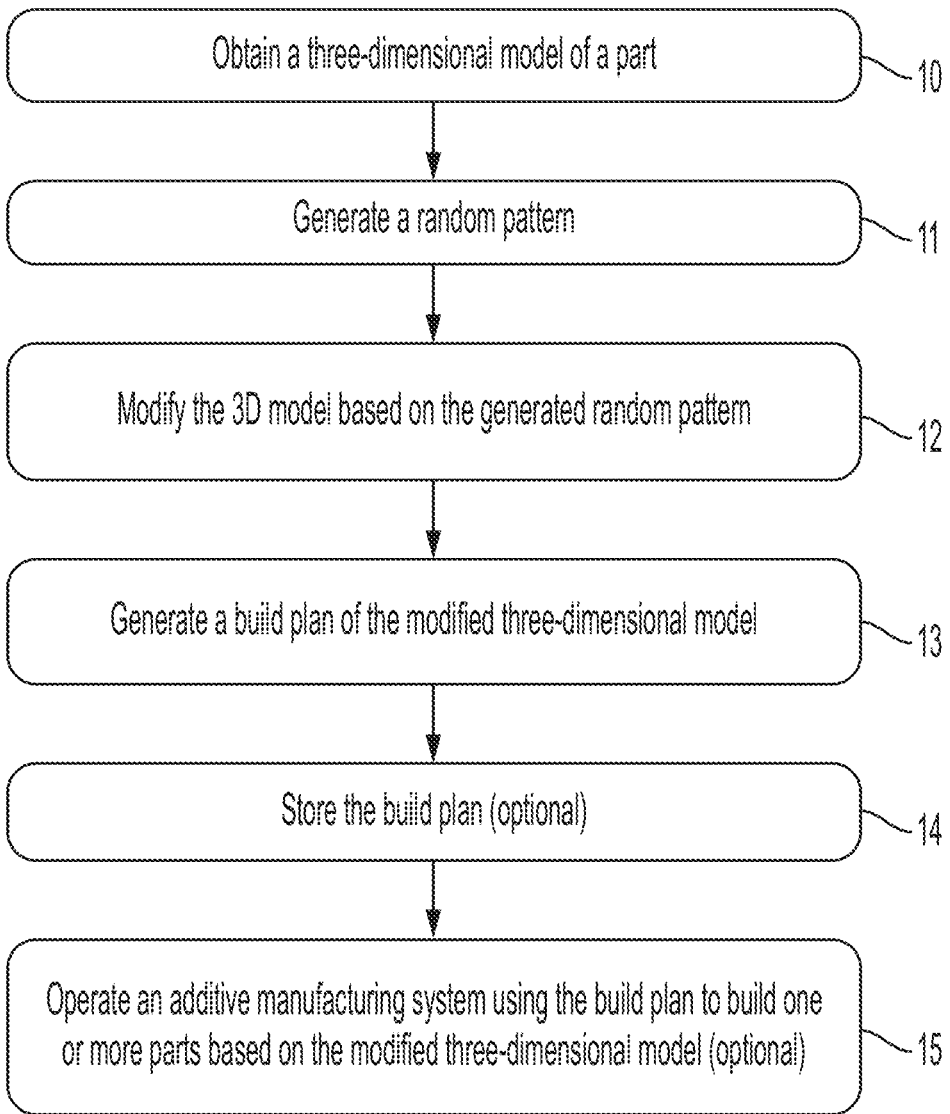
FIG. 1 is a flowchart detailing one embodiment of a process for creating a part.

Advancing technology and automation has made manufacturing faster, more efficient, and more accessible through mass production. However, mass production comes at a cost. Specifically, mass produced parts are intentionally standard and uniform in design to maximize efficiency, but this inherently results in a loss of uniqueness. Conversely, inefficient and time-consuming manual production of parts also may not be desirable from a product production perspective.

In view of the above, the Inventors have recognized the opportunities associated with the rise in use and capabilities of controllable manufacturing systems, such as additive manufacturing systems and controllable machining systems, to create parts with unique looks while still being capable of manufacturing parts in commercially relevant numbers and/or at commercially competitive price points. Specifically, the Inventors have recognized that these flexible manufacturing systems may permit the formation of patterns within an overall part without the need to create an inflexible dedicated manufacturing line. Further, as in nature, it may be possible to develop and apply patterns to provide a desired unique aesthetic for either individual parts, or a limited run of parts, similar to how nature grows patterns in unique and distinct ways that rarely result in duplication of a pattern. For example, coral has unique shapes, and grows in different rates and patterns in response to ever changing conditions, such that it is almost impossible for two pieces of coral to be identical. Thus, the Inventors have recognized the benefits associated with the production of parts using randomly generated patterns that may be integrated with parts to be manufactured with any desired additive, subtractive, or other appropriate type or combination of types of manufacturing processes that may be controlled to produce a part with a desired configuration. For example, a random decorative pattern may be generated using any appropriate type of random pattern generator and the pattern may be integrated with a model of a part as described herein which may then be used to manufacture the part with one or more appropriate manufacturing systems as elaborated on further below.

In view of the above, in some embodiments, a three-dimensional model of at least a portion of a part to be manufactured may be obtained. A random pattern generator may then generate a random decorative pattern, and the three-dimensional model may be modified at least in part based on the random decorative pattern. Depending on the desired use, when used to modify the three-dimensional model of the part, the pattern may either be used to form a surface pattern and/or it may form through holes through the part as the disclosure is not so limited. For example, the pattern may either be subtracted from and/or added onto the model of the part. As elaborated on further below, the resulting model may be used to generate appropriate build plans for controlling operation of any appropriate manufacturing system to produce the desired part. Again, this may permit the production of unique, or very limited numbers, of products with a desired decorative pattern.

The disclosed random pattern generator may be used to produce any appropriate type of random pattern. This may include, but is not limited to random fractal, random facet, random branching, random geometric, random fingerprint, random Voronoi, random circular, random linear, and/or any other appropriate type of random pattern generation protocol that is capable of generating a desired type of random pattern. The implementation and use of a random pattern generator and the resulting random pattern is described further below.

The disclosed systems and methods may be used to form any appropriate type of part in which it may be desirable to add ornamentation. For instance, in some embodiments, the part may be at least one selected from a door, handle, door fixture, latch, hinge, any other decorative fixture, and/or any other appropriate part on which it is desirable to add ornamental features. As noted above, in certain embodiments, a three-dimensional model to be modified may be a portion of a part, e.g., the grip of a door handle. Depending on the application, this isolation of the ornamental pattern to a portion of the part may offer one or more benefits including, but not limited to: a decrease in the computing power and time needed to customize a part and limiting the pattern to non-structurally important portions of the part.

While the disclosed embodiments may be used to form integral parts that do not need to be joined together, in some instances, the manufacturing methods disclosed herein may form one or more parts that are included in an overall assembly. In some such embodiments, an assembly may include multiple parts which may be assembled together where one or more of these parts may include ornamental patterns as disclosed herein. For example, these parts may be connected to one another in any appropriate fashion including, but not limited to, threaded fasteners, friction fits, adhesives, welds, brazing, interlocking mechanical features, and/or any other suitable types of connections. In instances in which multiple parts of the assembly include ornamental patterns, the different parts may be separated into multiple three-dimensional models, or may be joined together as a cohesive model. For example, in some embodiments, the different parts of the assembly may be modified as separate three-dimensional models that are manufactured separately and then assembled. In other embodiments, the different parts of the assembly may also be modified at the same time, e.g., as a pattern applied to the assembled part prior to using the modified parts from the assembly for manufacturing.

In some embodiments, a manufacturing system used to produce a modified part may be an additive or subtractive manufacturing system. In some embodiments, the manufacturing system is a metal additive manufacturing system though other appropriate types of materials and manufacturing methods may also be used. Additional additive manufacturing methods that may be used may include, but are not limited to, stereolithography (SLA), powder bed fusion, fused fabrication fusion, fused filament, investment/lost wax casting, and/or any other suitable type of additive manufacturing system. For example, in investment casting, a positive of a desired part may be created using additive manufacturing techniques using materials suitable for use in an investment casting processing including, but not limited to, a wax, a soluble material, and/or any other material that is capable of being printed using an additive manufacturing process and being used in an investment casting process. Subtractive manufacturing systems that may be used with the disclosed methods may comprise computerized numerical control (CNC) machining, electrical discharge machining, and/or any other suitable controllable subtractive manufacturing systems that may form a part using the methods disclosed herein. In some embodiments, the manufacturing system may use materials such as metals, ceramics, plastics, resins, and/or any other appropriate materials for a part.

In some embodiments, a pattern may be used to modify the surface of a three-dimensional model. Surface modifications may include color modifications, texture modifications, deposition of material onto a surface, and/or any other appropriate modifications. Surface modifications may be performed in the additive and/or subtractive manufacturing system or may be performed in a subsequent process. For example, color modifications may be formed on the surface by using materials with varying colors in an additive manufacturing system or printed onto the surface by a printer after the part has been performed. Additional color modification processes may include but are not limited to electroplating, physical vapor deposition (PVD), painting, anodizing, patinating, and heating. Texture modification processes may include but are not limited to grinding, milling, turning, polishing, and etching. In yet other embodiments, a pattern may be printed onto a surface using a printer. For instance, an ink jet printer or other appropriate type of printer may be used to print a randomly generated design onto a surface of an object in some embodiments.

For the sake of clarity, the embodiments described below are primarily described using an additive manufacturing process. However, it should be understood that any of the embodiments disclosed herein may be used with any appropriate additive and/or subtractive manufacturing process as the disclosure is not so limited. Therefore, any reference to the use of an additive manufacturing system herein should be understood to refer to corresponding processes being implemented for use with a subtractive manufacturing system as well.

As used herein, a build plan may refer to any set of instructions that may be used to operate one or more manufacturing systems to complete at least a portion of the manufacture of a part. For example, a build plan in reference to an additive manufacturing system may refer to the layer by layer instructions used by the additive manufacturing system to build the desired part. Alternatively, in the case of a subtractive manufacturing system, a build plan may refer to the set of instructions for the sections of material to be removed from a part using a cutting, milling, drilling, grinding, or other appropriate type of subtractive manufacturing process. Similarly, a build plan may include printing instructions in instances where a printer may print a desired pattern onto a surface. Thus, it should be understood that a build plan should not be limited to use with any particular type of manufacturing system as the disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts one embodiment of a method for producing a part with a random decorative pattern. Step 10 may include obtaining a three-dimensional model of a part. In such an embodiment, the geometry of the part may be represented through a three-dimensional model of an overall part geometry or the geometry of a portion of a part. The model may be obtained in any appropriate fashion. For example, the model may be selected from a database or otherwise recalled from non-transitory computer readable memory, and/or downloaded from a remote database, uploaded from a remotely located computing device. Alternatively, a three-dimensional model of the part can be created using any appropriate modeling software or generated using a scan of an exemplary part if a physical example of the part already exists. Thus, it should be understood that a three-dimensional model of a part, or a portion of a part, may be obtained in any appropriate fashion. Additionally, it should be understood that the three-dimensional model may be provided in any appropriate format this is compatible with the manufacturing systems and methods disclosed herein as the disclosure is not so limited. As elaborated on further below, in some embodiments, it may also be desirable to have a user identify, or otherwise provide information related to, decorative portions, non-decorative portions, structural nodes, structural portions, and non-structural portions of a part for use in subsequent steps of the design and manufacturing process. This may either be part of the information included in the three-dimensional model and/or may be manually input by a user depending on the embodiment.

In step 11, a random pattern may be generated by a random pattern generator. In some embodiments, the pattern generation process may be implemented using one or more growth rules as described in more detail in FIG. 2. Optionally, the random pattern generator may also generate a random pattern iteratively and/or recursively. The generated random pattern may then be used to modify at least a portion of the three-dimensional model of the part in step 12. In some instances, this may include scaling, rotating, and/or aligning the pattern with the three-dimensional model. However, instances in which a pattern is appropriately scaled and registered with the model during the pattern generation process are also contemplated. Modification of the three-dimensional model may include any one of additive, subtractive, and/or surface modifications of the three-dimensional model using the generated random pattern. For example, the modifications may be subtractive, where at least part of a bulk and/or surface of the three-dimensional model is removed using through holes, cut outs, surface patterns, and/or other negative features to be formed. Other methods of modifying the three-dimensional model may include additive and/or surface modifications, where at least a part of the generated random pattern may be added onto a surface of the three-dimensional model. While overall geometry may be altered in a model, in some embodiments, surface modifications to the three-dimensional model may also include, but are not limited to color, texture, material, and/or any other suitable parameter. It should be understood that combinations of additive, subtractive, and surface modification methods of modifying a three-dimensional model may also be used. Further, depending on the embodiment, more than one pattern may be used to modify the model as the disclosure is not limited to the type, number, or method use to modify a part with one or more random patterns.

After the three-dimensional model has been modified, the resulting modified three-dimensional model may be used to generate one or more build plans at step 13 to be used at least in part to control operation of one or more manufacturing systems configured to form at least one or more aspects of the part in an additive and/or subtractive formation process. Depending on the type of manufacturing system to be used, a build plan may include any appropriate type of instructions for manufacturing a part with a desired type of manufacturing system. This may include layer by layer build plans for an additive manufacturing system, cutting paths for a CNC or other subtractive machining system, and/or instructions for operation of any other appropriate type of manufacturing system. In some embodiments, a build plan may also include instructions regarding materials selections, color, texture, and/or any other desired parameter for formation of a part. In some embodiments, the build plan may be generated by at least one processor present in a manufacturing system to produce the part. Alternatively, the build plans may be generated by one or more processors located on a separate computing device which may or may not have also been used to generate the three-dimensional model including the desired random pattern.

After generating a build plan, the build plan may optionally be saved in non-transitory computer readable memory in step 14 for future recall and use, depending on user preference. For example, a user may choose to maintain any information associated with a part, such as the three-dimensional model, generated build pattern, and build plan, for future use. Alternatively, this information, including the build plan, may be discarded after production in instances where a customer wishes to have a unique part. For example, a user may prefer the design be discarded after the part has been made to ensure it is a unique part. Alternatively, the build plan, generated random pattern, and/or the modified models may be stored in non-transitory computer readable memory for future recall and use to manufacture additional parts.

Regardless of the above, after an appropriate build plan has been generated, the build plan may be used to operate an additive manufacturing system to form one or more portions of the part to be manufactured at step 15. This may include either additive and/or subtractive manufacturing processes using any appropriate type of manufacturing system to form either a part and/or it may be used to form a pattern on an existing part as the disclosure is not limited in this fashion.

FIG. 2 depicts one embodiment of a method for generating a random pattern using a random pattern generator. At step 21 a random pattern generator may be obtained. The random pattern generator may generate a new random pattern from scratch or take in an existing pattern and continue to propagate and/or modify the existing pattern. This may include operation of a software module on a computing device implementing the desired random pattern generator. The random pattern generator may also be any system, e.g., one or more processors implementing an appropriate computer program that is configured to creating a random pattern at least in two dimensions. In addition to randomly generating a desired type of random pattern, in some embodiments, a random pattern generator may generate the desired random pattern based at least in part on a set of growth rules which may influence the pattern generation process.

In some cases, a random pattern generator may generate random patterns which may be directly used to modify the three-dimensional model. But in other embodiments, the random pattern generator may need to generate a random pattern capable of fulfilling a set of decorative and/or physical constraints. These constraints may be designed around a set of design parameters, such as user preferences, aesthetic appeal, and/or structural integrity, which are described below in more detail. Thus, in some embodiments, the random pattern generator may be able to take in a set of growth rules which influence the pattern generation process which help the generated pattern conform to the set of design constraints.

In some embodiments, by taking into consideration a set of growth rules, the random pattern generator may favor certain outcomes that conform to the growth rules. The set of growth rules may include but are not limited to edge weights, structural nodes, and/or boundaries. The set of growth rules may influence properties of the generated random pattern including but not limited to the area of the generated pattern, the density of the pattern, and the growth of individual pathways within a pattern. In some embodiments, growth rules may be optionally ranked in priority for optimization depending on user preferences. A user may indicate that the structural integrity of an area is more important to maintain than aesthetic appeal, such that any pattern growth in an area is minimal despite the aesthetic appeal of certain pathways. A set of growth rules can also be created or modified after an initial random pattern is created. For example, after generating an initial pattern, the user may recognize that the random pattern does not offer enough structural support in an area, and may thus modify the growth rules to promote growth in one or more desired areas.

Furthermore, in some embodiments, a set of growth rules can be created and/or modified such that the random pattern generator can generate and/or propagate a random pattern similar to growth behaviors seen in nature. For example, the set of growth rules can be modified to imitate the behavior of natural organisms such as bacteria. Bacteria can react to incentives such as food sources by growing efficient pathways to them and avoid deterrents like toxins by modifying its pathways to avoid the area where toxins are detected. The random pattern generator may promote similar behavior through the use of growth rules such as edge weights and structural nodes. For example, assigning more favorable edge weights to certain pathways may promote the propagation of other pathways in the same direction, and defining structural nodes may allow certain areas to be free from any pattern generation. Instead, a pattern may grow outwards from the one or more defined nodes which may correspond to a solid unpatterned region of the part.

Some possible growth rules include defining edge weights, structural nodes, and/or boundaries, which may be inputs into the random pattern generator in steps 22a, 22b, and 22c. These and/or other growth rules may be used, at least in part, to aid in generating the desired random pattern. Not all of the shown growth rules in steps 22a-22c need to be defined, and any combination of these growth rules and/or the use of different types of growth rules may be implemented as the disclosure is not so limited.

Step 22a includes defining an edge weighting of the part where a user and/or the random pattern generator assigns weights to a plurality of pathways and/or regions present in the pattern. The weight assigned to a pathway and/or region may affect the probability in which the random pattern generator selects the pathway and/or region for propagation during a loop. For example, a favorably weighted pathway may have more new pathways branch off itself and/or experience an increase in thickness, as the pathway is picked more by the random pattern generator during a propagation loop. Edge weighting affects different basic pattern structures in different ways, e.g., increase in area, more branching, a change in the thickness of a pathway, etc. In one such example, larger edge weighting of a boundary, or other portion, of a part may increase the propagation of a pattern towards the edge weighted portion of the part.

In some embodiments, a frame or border region may be at least partially identified from the three-dimensional model and may be at least partially preserved during the pattern modification process. The location and dimensions of the frame or border region may change depending on the structural properties of the part. A frame may be designed for functional purposes, e.g., having a frame act as a guard around the edge of a handle modified by a pattern to minimize the discomfort of a user. In addition, a frame may be identified to optimize the aesthetic appeal of the part. Thus, in some instances, it may be desirable to avoid patterning of a frame or border region during the modification process of a model and random pattern generation. Accordingly, in some embodiments, a frame or border of a part may be defined as a solid region and the pattern may not be permitted to grow beyond the interior perimeter of this frame or border region which may extend at least partially, and in some instances completely, around the patterned portion of a part. Alternatively, even if a pattern were permitted to grow to a size and shape that extends beyond the frame or border region of a part, the modification to the part using the random pattern may be limited to portions of the part within the frame or border region.

As noted above, in some instances, a part may have functional constraints associated with forces applied to a part during use and/or operations to be performed by a part. Therefore, it may be desirable to only apply a randomly generated pattern to a portion of a part in some embodiments. For example, a three-dimensional model can be divided into decorative and/or non-decorative portions (e.g., functional, load bearing, or other appropriate portions of a part might be categorized as non-decorative portions). A decorative portion of the part can be at least partially modified by a random decorative pattern, while a non-decorative portion may not be modified by the random decorative pattern. Any identified decorative and/or non-decorative portions of a three-dimensional model may change depending on factors such as structural constraints, user preferences, and/or function of the part. The decorative portions and/or non-decorative portions may be marked using one or more boundaries which may represent the shape and dimensions of their respective decorative and/or non-decorative portions in some embodiments.

In some instances, it may be desirable to constrain a random pattern to be within a desired area. For instance, step 22b includes defining one or more boundaries of the portion of a part to be patterned in the random pattern generator, which may be used by the random pattern generator to constrain a generated random pattern to a desired size, shape, and/or region of the part to populate a pattern within. The boundaries may define any appropriate shape and/or dimensions of an area available to the random pattern generator for generating a random pattern and may constrain pattern generation to be within the defined boundaries. In some embodiments, generating a random pattern constrained to be within these boundaries may facilitate the easy modification of a model with a pattern that is already of the correct size and overall shape. Furthermore, constraining the pattern generation to boundaries may decrease the amount of computing time and/or power used by the pattern generation process, as the random pattern generator may account for a decreased amount of probabilities and/or pattern pathways. The boundaries may also be used in a model modification step to define the areas of the model which may be modified with the pattern.

As noted above, in some instances it may be desirable to provide for unpatterned sections of a part within an overall patterned region for structural and/or functional constraints. This may be done using nodes as part of the overall random pattern generation in some embodiments. Step 22c comprises defining one or more structural nodes, which may be previously identified from the three-dimensional models of a part as regions with structural importance during initial modeling. The random pattern generator may take structural nodes into consideration by avoiding an area around the structural node, decreasing the amount of random pattern generated and/or propagated in the area, and/or changing a type of the pattern propagated in the area to avoid comprising the structural integrity of the part. Structural nodes may exist in the same areas as decorative and/or non-decorative portions, and may be prioritized before decorative and/or non-decorative portions by the random pattern generator. For example, a structural node may be defined in a decorative portion of the three-dimensional model, but the random pattern generator may avoid generating a pattern in the structural node despite the area being designated as decorative. Additionally, through the use of weighting of growth either towards and/or away form the nodes, it may be possible to control the growth of patterns relative to the nodes to ensure there is sufficient connection of the nodes to surrounding portions of the part for desired structural and/or functional purposes.

In step 23, appropriate prioritization and constraint of the random pattern generator using the growth rules defined in steps 22a-22c may be done. For instance, in some embodiments, the set of growth rules may determine the magnitude, location, direction weighting, boundaries, thickness, complexity, and/or any number of other considerations that may be used during pattern generation by the random pattern generator. However, the rules may conflict with each other in some instances. For example, continued growth in a favored direction past a boundary may not be permitted. Thus, in some embodiments, A random pattern generator may also optionally take into consideration a priority ranking for the set of defined growth rules, such that the random pattern generator may constrain the growth rules appropriately to avoid conflicts during pattern generation. For example, in case of a conflict between rules such as a direction for pattern generation and a model frame or other appropriate border, a user may allocate the model frame to be of higher priority and disallow pattern generation past the desired area. Prioritization and/or other appropriate constraints on the growth rules may vary depending on the specific type of part to be formed and/or the pattern to be generated. Thus, the disclosure is not limited to any specific type of constraint or prioritization of the growth rules used by a random pattern generator.

By default, without any constraints or growth rules, the random pattern generator may generate new random patterns and/or propagate existing patterns such that all possible outcomes have an equal probability of occurring. The random pattern generator may propagate an existing pattern by replicating the basic structure of the existing pattern in available space free from the existing pattern. For example, the propagated pattern may branch off the pathways of the existing pattern and grow in the available free space. The random pattern generator may also propagate a pattern by selecting pathways and/or regions at random over a defined number of times over a propagation loop. For example, each pathway and/or region may have a probability of being selected by the random pattern generator during propagation. If a pathway and/or region is selected, they may be chosen as the site of a propagating action. In some cases, a selected pathway and/or region may serve as the site for a new pathway and/or region to grow from during propagation. In other cases, a pathway and/or region may grow in size as they are selected. The random pattern generator may assign a number of times a pathway and/or region is selected for each propagation loop, and for some cases, the size of each pathway and/or region may be reassigned depending on a number of times each pathway and/or region is selected. The number of times a pathway and/or region is chosen per propagation loop may be changed according to user preference. e.g., decide how the degree to which a pattern propagates during a single loop. The random pattern generator may propagate each pattern differently depending on their basic pattern, e.g., circular, Voronoi, fractal, etc. Thus, it should be understood that any appropriate type of propagation cycle may be used by a random pattern generator to generate a random pattern.

While unconstrained pattern generation may be used in some embodiments, as noted above, in some instances, constraints imposed on the random pattern generator through a set of defined growth rules may be used to affect the patterns that are generated. In step 24, a random pattern generator, after being constrained by a set of defined growth rules in step 23, may generate a random pattern which complies with the constraints. In some embodiments, growth rules such as structural nodes, frames, weightings, boundaries, and/or other appropriate constraints may decrease and/or increase the probability of pattern generation and/or propagation in certain regions. For example, the presence of a structural node in a region may decrease the probability a new pattern is generated and/or existing pathways are propagated into the region of the structural node to preserve the structural integrity of the structural node. In some embodiments, areas with increased weighting may be associated with an increased probability of the random pattern generator selecting the associated regions for pattern generation and propagation. The degree to which the probabilities of the pattern generation are affected by any growth rule may depend on the properties of the growth rule and overall properties of the random pattern generator. In either case, after the random pattern generation has been constrained, the random pattern generator can generate a random pattern according to growth rules using the random patter generator to step 24.

After the random pattern generator generates a random pattern, the random pattern may optionally be examined to see if the random pattern fulfills a set of desired design parameters based at least in part on user requirements, structural considerations, and/or any other applicable standards, as shown in step 25. The random pattern generator may use a set of growth rules designed to encourage conformation to the set of desired design parameters, but due to the random nature of the pattern generation, the resulting generated pattern may not fulfill the set of design parameters. In some embodiments, methods of determining whether a generated pattern fits a set of desired design parameters may comprise a quantitative and/or qualitative examination of the generated pattern, which may be performed by a system, a human, or any possible combination of machine and/or human-based procedures. For example, a generated pattern may be examined to see if the pattern fills a space within one or more boundaries (e.g., whether the generated pattern conforms to a desired shape and/or dimension, such as filling in a decorative portion of a part). Other methods of examination include but are not limited to determining if the generated pattern offers sufficient support in a structural portion, structural node, and/or boundary (e.g., evaluating expected stresses on the part during use using finite element modeling), determining if the generated pattern conforms to an aesthetic standard, and/or any other suitable method. The generated pattern may undergo any number or combination of examinations.

In some embodiments, the generated pattern may meet the design parameters at condition 25 and move onto the following steps without entering loop 26. If the random pattern does not meet the desired design parameters at step 25, the random pattern generation process may enter loop 26 and repeats step 21 to step 25, where the random pattern generator may take the currently generated pattern and continue to modify and/or propagate the generated random pattern until a generated pattern fulfills the requirements to modify the model. In some embodiments, the random pattern generator may also generate a new pattern at step 21 upon entering loop 26, instead of modifying the existing pattern from the previous pattern generation. Furthermore, when the pattern generation process traverses through loop 26, the growth rules may be optionally modified in step 26*b*, to better facilitate obtaining the desired design parameters for the generated pattern. In some embodiments, only a portion of the growth rules may be modified, such as those seen in steps 22*a*-22*c*, or other growth rules may be modified as the disclosure is not so limited. Upon reaching condition 25 again, after constraining the random pattern generation according to either the original set of growth rules or a modified set of growth rules in step 23 and generating a random pattern in step 24, if the generated pattern still does not meet the design parameters, loop 26 can be repeated to generate either a new pattern or continue to propagate the existing pattern as many times as need to produce a pattern meeting the desired design parameters of a user.

If a generated pattern fits the set of design parameters, then condition 25 may move onto steps 27, where the generated random pattern may optionally be vectorized. Vectorization may allow the generated pattern to be scaled without loss of detail, which may be helpful in model modification, but is not required for all embodiments. In some embodiments, a generated pattern may be vectorized prior to being used to modify at least in part a three-dimensional model, which may allow the pattern to be scaled up or down to align properly with a desired location on the three-dimensional model. The vectorization process may be performed within the random pattern generator, a processor of a system for manufacturing a part, and/or may be exported and performed using any appropriate system as the disclosure is not limited in this fashion.

The generated pattern may either be used immediately to modify a model of a part in a process similar to that described above relative to FIG. 1. However, in some embodiments, if a generated pattern fits the set of design parameters, then the generated pattern may be optionally stored in non-transitory computer readable memory. The non-transitory computer readable memory may be associated with a manufacturing system, a remote database, or any other applicable system. As noted above, the generated pattern may or may not be vectorized prior to storage.

In some embodiments, the various methods described above and elsewhere herein may be embodied as software capable of performing any of the disclosed methods regarding creating a part with a decorative pattern. In other embodiments, the associated methods may be performed using separate programs and/or modules as the current disclosure is not limited to being performed on a single computing device and/or system. For instance, the methods of pattern generation and vectorization may be performed within the same program, before being exported to a separate program for model modification and build plan generation. Additionally, the various embodiments described herein may be implemented as processor executable instructions stored on non-transitory computer readable memory that when executed by one or more processors perform any of the methods disclosed herein.

Example: Pattern Generation and Part Manufacturing

Figure 3A:
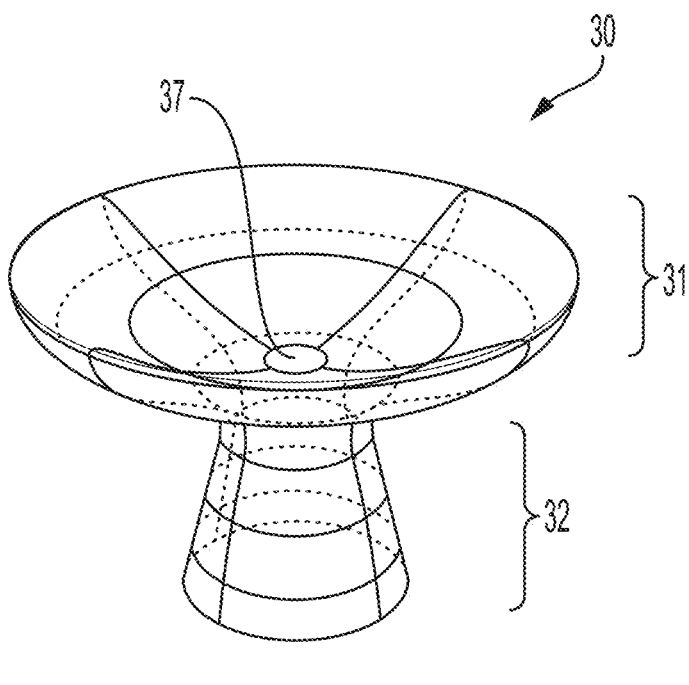
FIG. 3A is a perspective view of a three-dimensional model of a part, according to one embodiment.

FIGS. 3A-3D depict the process of modifying a three-dimensional model 30 of a bowl with a raised base with a generated pattern 33, to create a final product 39. FIG. 3A depicts an undecorated three-dimensional model 30 of a part comprised of an upper portion of a bowl, and a lower portion of a raised base attached to the bottom of the bowl. The upper portion is designated as a decorative portion 31 of the part, and the lower portion is designated as non-decorative portion 32 of the part. Portions may be designated as decorative and/or non-decorative due to structural concerns and/or user preferences. For example, in other embodiments, the lower portion of the part 30 may also be designated as a decorative portion. The boundaries of the decorative and/or non-decorative portions may be defined and used in the pattern generation and/or model modification processes to define a shape and dimension of the decorative and/or non-decorative portions. The location of the part where the lower portion is attached to the upper portion is designated as a structural node 37 due to the structural importance of the location. The structural node 37 may be taken into consideration in the pattern generation and/or model modification process. After a three-dimensional model of the part is obtained and different portions of the model are categorized, a random decorative pattern may be generated to decorate the part.

Figure 3B:
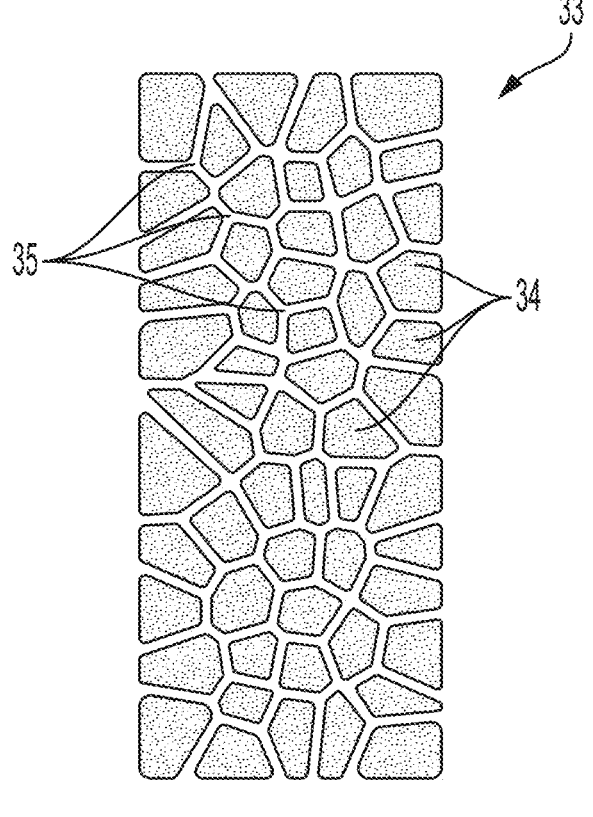
FIG. 3B is a random decorative pattern generated by a random pattern generator, according to one embodiment.

In some embodiments, a random pattern generator may generate a random decorative pattern 33 such as the Voronoi pattern in FIG. 3B, with dark regions 34 and light outlines 35. While not applied in the generated pattern 33, some random pattern generators may consider growth rules, such as the structural node 37 where the bowl is attached to the raised base in the model 30. If the random pattern generator had considered the structural node 37 while generating the pattern, there may be a circle, or a region similarly-shaped to the structural node 37, in the generated pattern 33 free from any designs. Similarly, while not shown in FIG. 3B, the random pattern generator could have considered the boundaries of the decorative 31 and/or non-decorative 32 regions of the part 30 in FIG. 3A. For example, if the random pattern generator had considered the circular decorative portion 31 of the bowl, the generated pattern may have been constrained to an area in the shape of a circle. Edge weighting may have been applied to the generated Voronoi pattern through multiple possible methods. For example, edge weights could have been assigned to the dark regions 34, such that a more favorable weight in any dark region leads to an increase in area of the dark regions. Edge weighting could have also been performed on the light outlines 35, where favorable weights may lead to thicker outlines. Any combination of edge weighting assignments described above may be possible, depending on a set of defined design parameters that a user may prefer to optimize in the pattern generation process.

Figure 3C:
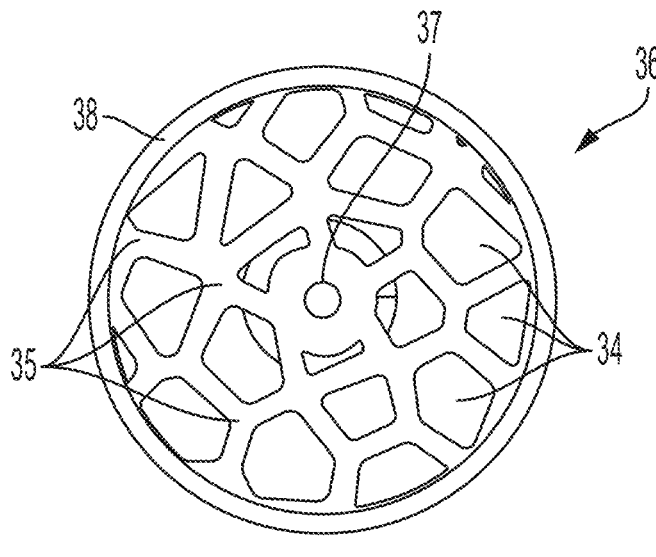
FIG. 3C is a top view of the three-dimensional model of the part from FIG. 3A modified using the random pattern of FIG. 3B, according to one embodiment.

After the pattern is generated, the three-dimensional model 30 may be modified based on the generated random patter 33, as seen in FIG. 3C. In this embodiment, the dark regions 34 of the pattern are portions of the generated pattern 33 which are cut out from the three-dimensional model 30, while the light outlines 35 are preserved. The structural node 37 is prioritized over the decorative portion, and as such, the structural node 37 remains free from any pattern modification despite being overlaid the decorative portion 31 of the model. A frame 38, which did not exist in the original three-dimensional model 30, has been preserved in the modified three-dimensional model 36. The frame 38 circles around the rim of the bowl and remains free from modification by the pattern 33. The frame 38 may have been preserved to offer additional structural support to the decorative portion 31, which has significant portions of its bulk cut out due to the method in which the pattern was applied to the model. For example, any weight in the bowl presses the bulk of the bowl outwards. As such, the frame 38 around the edges of the bowl may better assist the bowl in withstanding pressure.

While it may be possible for pattern modification to be performed as seen in FIG. 3C, it should be understood that other arrangements may be suitable. For example, other embodiments may have the generated pattern 33 engraved or modified a surface of the part. Furthermore, in some embodiments, the pattern modification may apply the pattern to the structural node 37, though due to the importance of the structural node 37, the magnitude and/or complexity of the pattern modification in the structural node may be reduced. In addition, the frame 38 around the rim of the bowl may not be present or may be of a different shape and/or thickness in some embodiments.

Figure 3D:
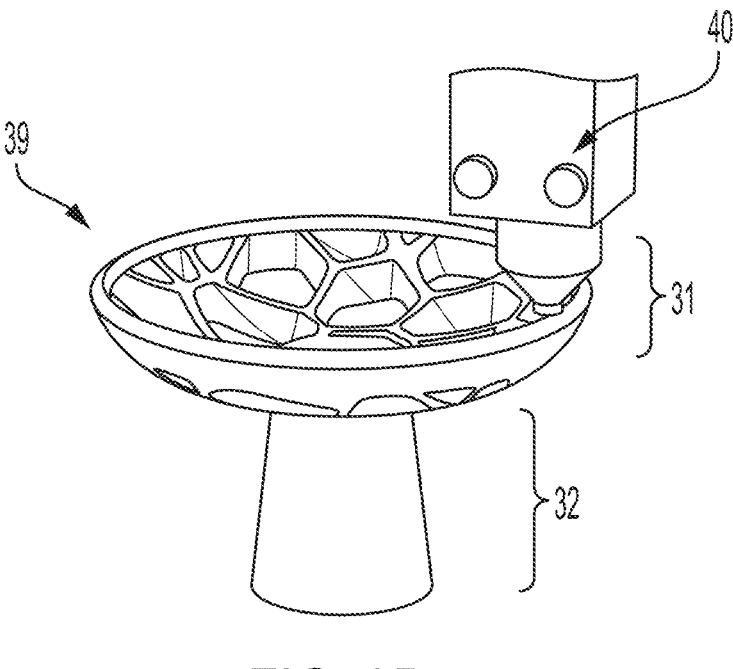
FIG. 3D is a perspective view of a part printed by an additive manufacturing system based on the modified three-dimensional model of FIG. 3C, according to one embodiment.
Figure 4:
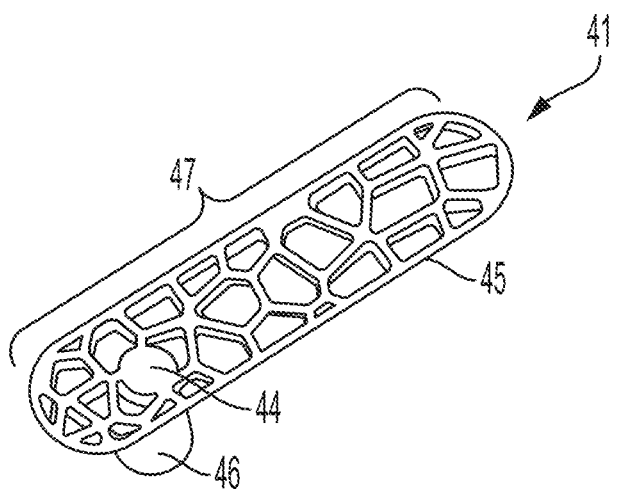
FIG. 4 is a perspective view of a door handle including a random pattern formed therein, according to one embodiment.

After the design of the modified three-dimensional model 36 is finalized, the modified model 36 may be sent to a manufacturing system for production. In this embodiment, a build plan is generated from the modified three-dimensional model 36 and is sent to an additive manufacturing system 40 as seen in FIG. 3D. The additive manufacturing system 40 manufactures the modified three-dimensional model 36 through three-dimensional printing. The resulting final product 39 is created layer by layer in an upwards vertical direction, which allows the cutouts from the dark regions 34 of the generated pattern to be formed using a single manufacturing system. In some embodiments, the build plan may involve multiple manufacturing systems; for example, the cutouts in the bowl may be removed in a subtractive manufacturing process after the overall bowl is produced. In other embodiments, it also may be possible for the base non-decorative portion 32 of the product 39 to be manufactured separately from the bowl decorative portion 31, and have the two parts be assembled together afterwards.
Example: Exemplary Patterned Parts FIGS. 4-6 depict alternative possible parts modified with a generated Voronoi pattern similar to that shown in FIG. 3B. These examples are elaborated on further below.

FIG. 4 shows a three-dimensional model of a door handle 41 modified with the generated Voronoi pattern 33 on its grip. The grip is a decorative portion 47 of the door handle 41, and is modified with the pattern 33 through a subtractive modification, where the bulk of the handle is cut out at the dark regions 34 of the generated pattern. A base, the non-decorative portion 46, of the door handle and the structural node 44, where the grip of the handle is attached to the base of the handle, remain unmodified by the pattern. A frame 45 runs along the edges of the decorative portion 47, and may have been preserved from the original model and/or added to the original model due to functionality, such that a user may hold the grip of the door handle without discomfort.

Figures 5A, 5B:
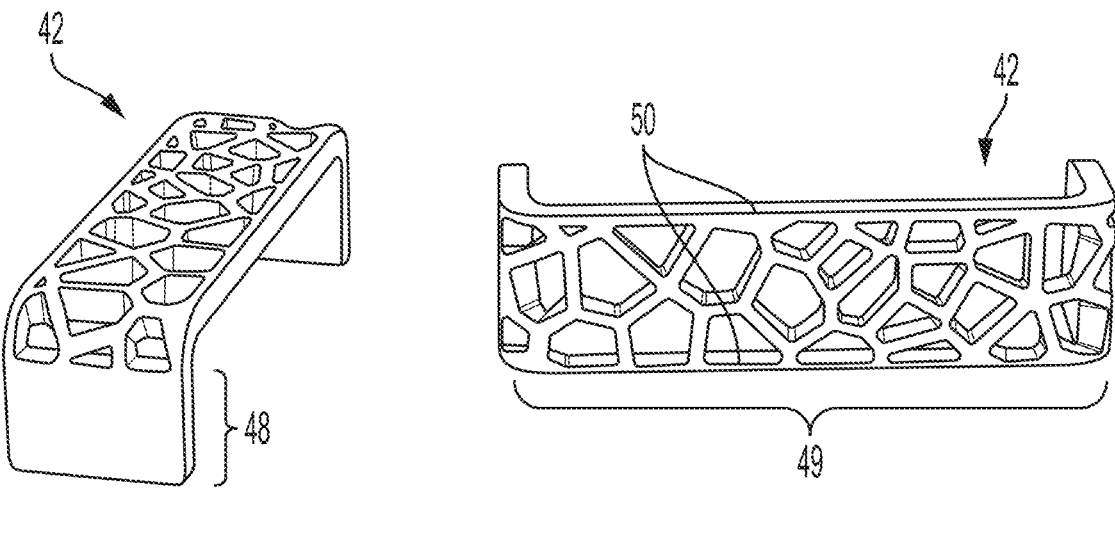
FIGS. 5A-5B are perspective views of a cabinet puller including a random pattern formed therein according to one embodiment.
Figure 6:
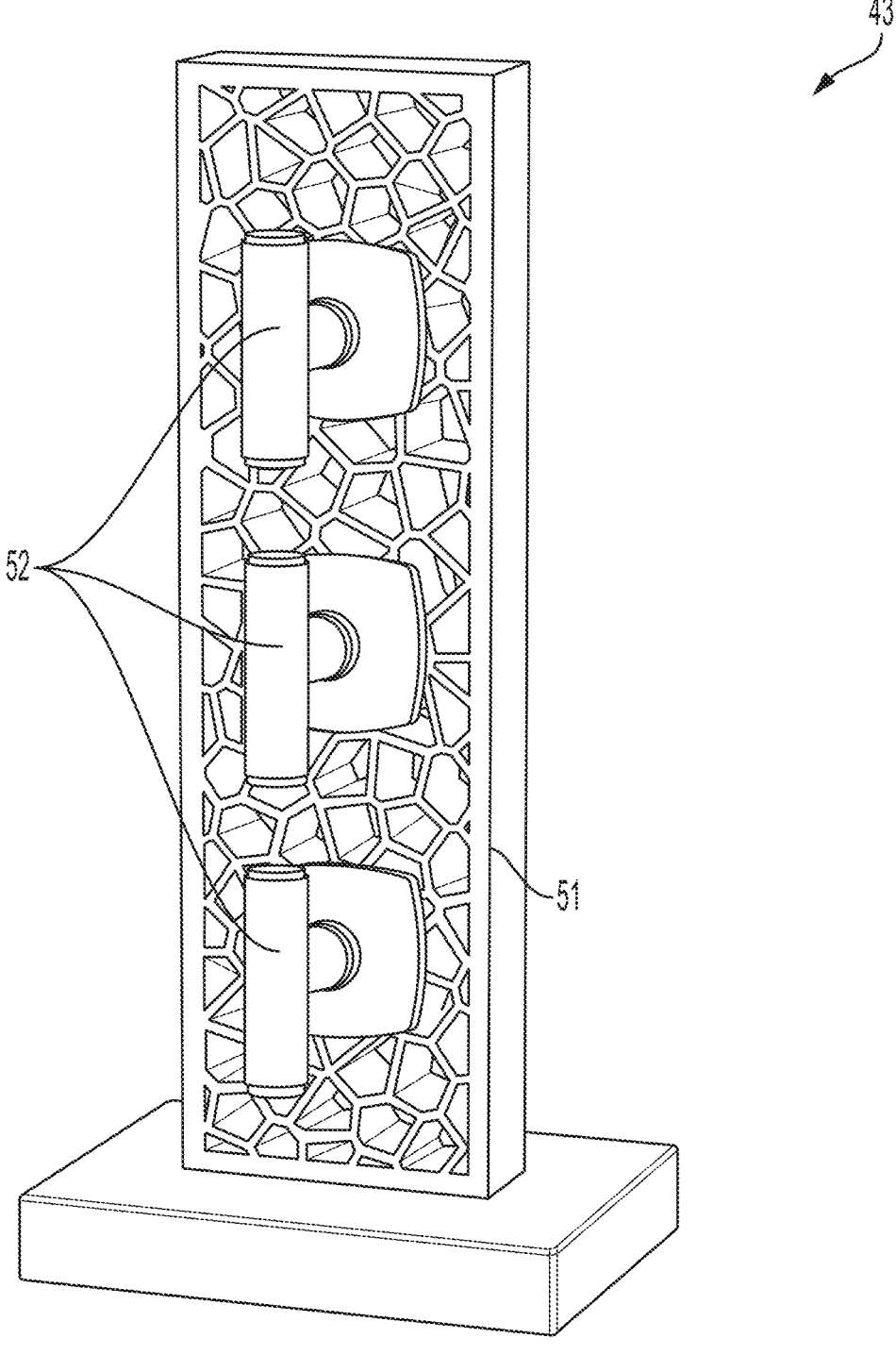
FIG. 6 is a perspective view of a display mount including a random pattern formed therein, according to one embodiment.

FIGS. 5A-5B shows one possible embodiment of cabinet handles 42 modified with a generated pattern similar to the Voronoi pattern shown in FIG. 3B. The cabinet handles comprise one long piece of material, with the ends bent to attach to a surface. The decorative portion 49 of the model, which extends along the grip and slightly past the points where the material bends, have been modified with the generated Voronoi pattern 33. Much like FIG. 4, the dark regions 34 of the generated pattern are cut out from the bulk of the cabinet handle. A frame 50 has been preserved along the edges of the decorative portion 49, which may decrease the discomfort associated with a user gripping onto the handles 42. The ends of the handles are non-decorative portions 48, which may be to avoid compromising the structural integrity of the ends as future mounting mechanisms may need to be installed in the same area. Furthermore, as the ends of the handles are bent to be transverse to a surface they are mounted to, it is difficult to observe any patterns or decorations at the ends, so the ends could remain unmodified to minimize the amount of work associated with designing and manufacturing a part while optimizing the aesthetic value of the part.

FIG. 6 shows one possible embodiment of a display mount 43 modified with the generated pattern 33. The display mount 43 comprises a block of material, and the entire bulk of the material has been modified with the generated pattern 33, with the exception of a frame 51 and possible structural nodes, which are not depicted in the current perspective, at the locations where hooks 52 are attached to the display mount.

The various methods disclosed above may be implemented by one or more controllers including at least one processor operatively coupled to the various controllable portions of a manufacturing system as disclosed herein. Alternatively or additionally, in some embodiments, the disclosed methods may be performed at least in part, and in some instances completely, on a computing device that is separate and removed from the disclosed manufacturing systems. In either case, the disclosed methods may be embodied as computer readable instructions stored on non-transitory computer readable memory associated with the at least one processor such that when executed by the at least one processor the associated system, which may be an additive manufacturing system in some embodiments, may perform any of the actions related to the methods disclosed herein. Additionally, it should be understood that the disclosed order of the steps is exemplary and that the disclosed steps may be performed in a different order, simultaneously, and/or may include one or more additional intermediate steps not shown as the disclosure is not so limited.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Figure 7:
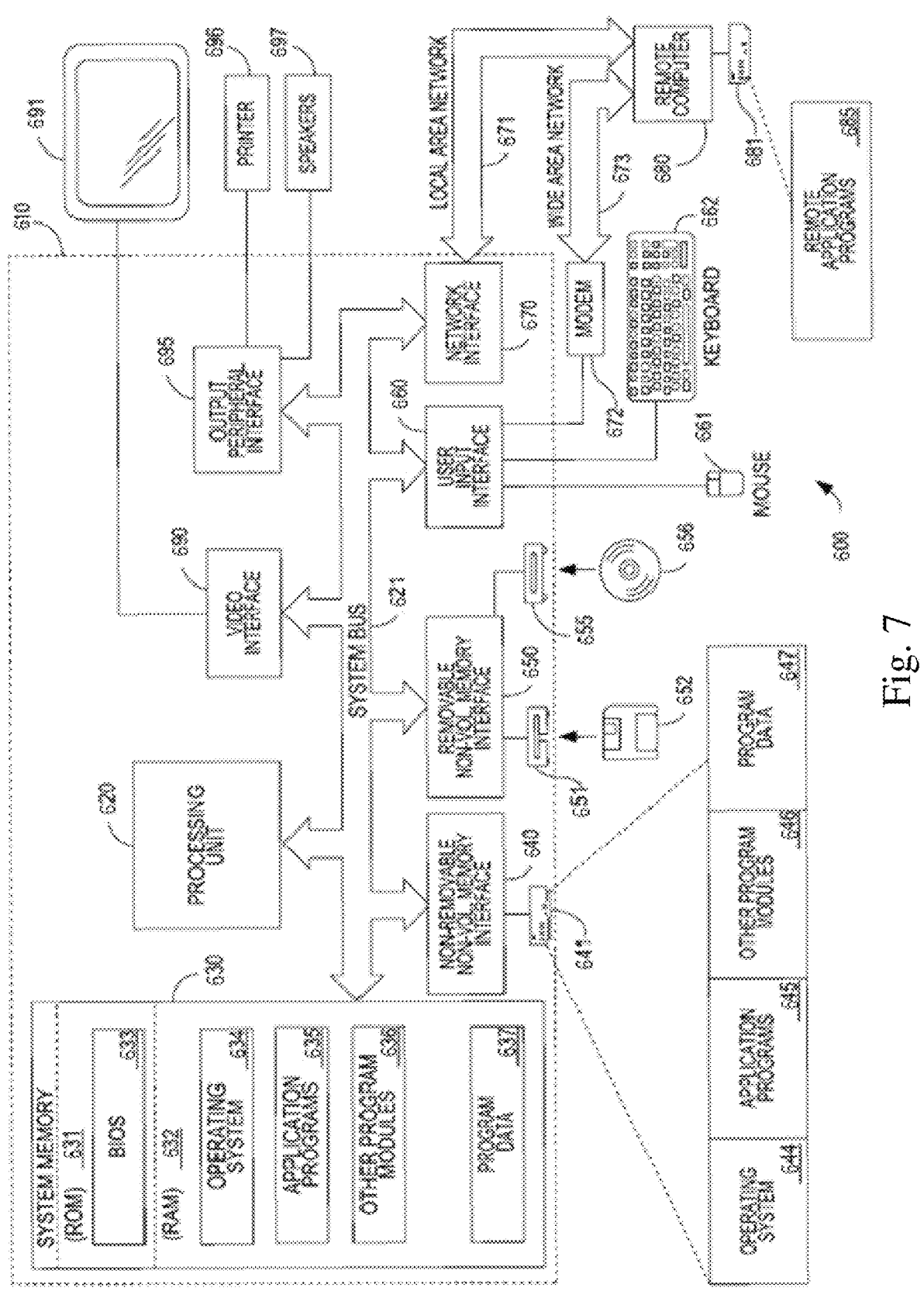
FIG. 7 is a schematic representation of a general purpose computing device.

With reference to FIG. 7, an exemplary system for implementing aspects of the disclosure includes a general purpose computing device in the form of a computer 610 or other appropriate computing device. For example, the depicted computing device may be used as a decorative part manufacturing system configured to implement any of the methods disclosed herein. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 7 illustrates operating system 634, application programs 635, other program modules 636, and program data 637.

The computer 610 may also include other removable/non-removable, volatile/nonvolatile computer storage media. By way of example only. FIG. 7 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through an non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 7, provide storage of computer readable instructions, data structures, program modules and other data for the computer 610. In FIG. 7, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 7. The logical connections depicted in FIG. 7 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 7 illustrates remote application programs 685 as residing on memory device 681. It will be appreciated that the network connections shown are exemplary and other means of establishing a communications link between the computers may be used.

The various methods or processes outlined herein may be implemented in any suitable hardware. Additionally, the various methods or processes outlined herein may be implemented in a combination of hardware and of software executable on one or more processors that employ any one of a variety of operating systems or platforms. Examples of such approaches are described above. However, any suitable combination of hardware and software may be employed to realize any of the embodiments discussed herein.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present disclosure. The non-transitory computer-readable medium or media may be transportable, such that the program or programs stored thereon may be loaded onto any computer resource to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion among different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A method of manufacturing a part, the method comprising:
  obtaining a three-dimensional model of at least a portion of the part;
  generating a random decorative pattern using a random pattern generator based on the three dimensional model and a set of growth rules configured to provide structural integrity of an identified structural portion of the part by constraining random pattern propagation into a corresponding structural portion of the three-dimensional model;
  modifying the three-dimensional model based at least in part on the random decorative pattern;
  generating a build plan based at least in part on the modified three-dimensional model; and
  operating a manufacturing system based at least in part on the build plan to form the part, with the manufacturing system comprising at least one of a three-dimensional printing device and a machining device.

2. The method of claim 1, wherein the random decorative pattern is at least one selected from a random fractal, facet, branching, geometric, fingerprint, Voronoi, and circular pattern.

3. The method of claim 1, wherein the part is at least one selected from a door, handle, door fixture, latch, and hinge.

4. The method of claim 1, wherein generating the random decorative pattern includes edge weighting at least a portion of the three-dimensional model.

5. The method of claim 1, further comprising defining one or more nodes, and wherein generating the random decorative pattern includes weighting growth of the random decorative pattern towards the one or more nodes.

6. The method of claim 1, further comprising preventing patterning of a frame or border of the part.

7. The method of claim 1, wherein modifying the three-dimensional model includes vectorizing the random decorative pattern.

8. The method of claim 1, wherein modifying the three-dimensional model includes subtracting the random decorative pattern from the three-dimensional model.

9. The method of claim 1, wherein the random decorative pattern is a surface pattern.

10. The method of claim 1, wherein the random decorative pattern is a cut out.

11. A non-transitory computer readable memory including processor executable instructions that when executed perform the method of claim 1.

12. A system for manufacturing a part with a decorative pattern comprising:

one or more processors configured to:

obtain a three-dimensional model of at least a portion of the part;

generate a random decorative pattern using a random pattern generator based on the three dimensional model and a set of growth rules configured to provide structural integrity of an identified structural portion of the part by constraining random pattern propagation into a corresponding structural portion of the three-dimensional model;

modify the three-dimensional model based at least in part on the random decorative pattern;

generate a build plan based at least in part on the modified three-dimensional model; and operate a manufacturing system based at least in part on the build plan to form the part, with the manufacturing system comprising at least one of a three-dimensional printing device and a machining device.

13. The system of claim 12, wherein the part is at least one selected from a door, handle, door fixture, latch, and hinge.

14. The system of claim 12, wherein the random pattern generator edge is configured to edge weight at least a portion of the three-dimensional model during pattern generation.

15. The system of claim 12, wherein the processor is configured to obtain one or more nodes, and wherein generating the random decorative pattern includes weighting growth of the random decorative pattern towards the one or more nodes.

16. The system of claim 12, wherein random pattern generator is configured to prevent patterning of a frame or border of the part.

17. The system of claim 12, wherein the one or more processors are configured to vectorize the random decorative pattern and modify the three dimensional model using the vectorized random decorative pattern.

18. The system of claim 12, wherein the one or more processors are configured to subtract the random decorative pattern from the three-dimensional model.

19. The system of claim 12, wherein the generated random decorative pattern is a surface pattern.

20. The system of claim 12, wherein the generated random decorative pattern in a cut out.

\* \* \* \* \*